(12) United States Patent
Berme

(10) Patent No.: US 6,354,155 B1
(45) Date of Patent: Mar. 12, 2002

(54) MULTI-COMPONENT FORCE AND MOMENT MEASURING PLATFORM AND LOAD TRANSDUCER

(75) Inventor: Necip Berme, Worthington, OH (US)

(73) Assignee: Bertec Corporation, Worthington, OH (US)

( * ) Notice: Subject to any disclaimer, the term of this patent is extended or adjusted under 35 U.S.C. 154(b) by 0 days.

(21) Appl. No.: 09/324,340

(22) Filed: Jun. 2, 1999

(51) Int. Cl.[7] ................................................ G01D 7/00
(52) U.S. Cl. ................................................ 73/862.043
(58) Field of Search ...................... 73/862.043, 862.044, 73/862.66, 151, 862.65, 862.041

(56) References Cited

U.S. PATENT DOCUMENTS

| | | | |
|---|---|---|---|
| 3,614,488 A | | 10/1971 | Sonderegger |
| 3,640,130 A | * | 2/1972 | Spescha et al. ................ 73/133 |
| 3,712,123 A | | 1/1973 | Laimins |
| 3,939,704 A | | 2/1976 | Ziplin |
| 4,088,015 A | | 5/1978 | Wolfer |
| 4,094,192 A | | 6/1978 | Watson |
| 4,398,429 A | | 8/1983 | Cook |
| 4,483,203 A | | 11/1984 | Capper |
| 4,493,220 A | * | 1/1985 | Carignan et al. ......... 73/862.66 |
| 4,545,262 A | | 10/1985 | Hellwig |
| 4,823,618 A | | 4/1989 | Ramming |
| 5,029,483 A | | 7/1991 | Gautshi |
| 5,315,882 A | | 5/1994 | Meyer |
| 5,339,697 A | | 8/1994 | Mullin |
| 5,349,871 A | | 9/1994 | Naganuma |
| 5,400,661 A | | 3/1995 | Cook |
| 5,490,427 A | | 2/1996 | Yee |
| 5,526,700 A | | 6/1996 | Akeel |
| 5,814,740 A | * | 9/1998 | Cook et al. ............. 73/862.641 |
| 5,824,917 A | | 10/1998 | Kluft |
| 5,835,977 A | | 11/1998 | Kamenster |
| 5,889,214 A | * | 3/1999 | Kang et al. ............. 73/862.044 |
| 5,922,967 A | * | 7/1999 | Motoyama ................... 73/794 |

FOREIGN PATENT DOCUMENTS

WO     WO9904235 A1     1/1999

* cited by examiner

Primary Examiner—Benjamin R. Fuller
Assistant Examiner—Jewel V. Thompson
(74) Attorney, Agent, or Firm—Francis T. Kremblas, Jr.

(57) ABSTRACT

This invention utilizes geometrically positioned strain gages attached to load cells (pylons) where each cell measures all force and moment components (Fx, Fy, Fz, Mx, My, Mz), thereby measuring all six degrees of freedom. The independent measurements eliminate the need for one cell's dependency on another, therefore reducing assumption, calculation, and cross-sensitivity errors. At least two load cells are attached to a top plate, to which the load is applied, and an optional bottom plate and an optional mounting plate. These force plates can be connected together to form an array of plates to measure multiple instances of load application over a greater area. The signals produced can be transmitted via wiring or wireless means either directly to a data collection device, or to a connector board, then through an optional pre-amplifier and a second stage amplifier for signal amplification and conditioning, then, finally, the data is received by a data collection device for interpretation and reading. The output can be six or more channels, and can be electronically combined to six channels.

5 Claims, 5 Drawing Sheets

MULTI-COMPONENT FORCE AND MOMENT MEASURING PLATFORM AND LOAD TRANSDUCER

BACKGROUND OF THE INVENTION

Measurement of forces and moments using strain-gaged load transducers is well known in the art. A typical transducer utilizes an elastic element which deforms under the applied load. Single or multiple strain gages attached to this elastic element convert the mechanical deformations of the said element into electrical signal(s), which can be measured by appropriate instrumentation. Thus, the applied load can be determined from the measured signals.

Traditionally, a load cell has been instrumented with as many independent strain-gaged channels as the number of desired outputs, or the number of degrees of freedom desired to be measured at the output. When several load cells are used as part of a single system to measure the six independent loads, or degrees of freedom possible, the appropriate gages in the load cells are interconnected to provide the output signals. An example of such a transducer is known as a force plate or a force platform.

All force plates make use of the specialized geometry of the load cells themselves, or the position and orientation of the strain gages, or both, to measure the desired loads. Current force plates utilize two, three, or four load cells, the latter being the most commonly used design. In these current designs, the three force components at each load cell are individually measured and summed up. However, the moment components are not individually measured at each load cell. For example, in a design utilizing four load cells, two of the moment components are obtained from the differences between the vertical force components in the load cells, and the torque is determined by summing shear forces about the center of the force plate. Designs utilizing two and three load cells have similar measurement methods. These types of designs introduce limitations and possible errors. For example: first, building force plates with large spans between the load cells results in relatively low natural frequencies or undesirably large instrument heights; second, mounting the load cells either to a rigid base plate or a rigid external surface is a general requirement.

The present invention relates to both single and multi-component load transducers utilizing multiple load cells as an integral part of the design. In each load cell, at least as many independent channels as the load components transmitted by the load cell are measured. Therefore, all the load components are accounted for utilizing independent force and moment measurements from the individual load cells. The present invention also includes designs where channels from different individual load cells are interconnected. Thus, the errors and limitations from the prior art (as noted above) are greatly reduced.

BRIEF SUMMARY OF THE INVENTION

The invention described herein relates to the measurement of forces and moments utilizing multiple load cells (otherwise known and referred to as "pylons") which form an integral part of a system (a "transducer", otherwise known and referred to as a "force plate" or a "force platform") or a combination of multiple systems (a force plate or force platform "array"). Each pylon is capable of measuring all six degrees of forces and moments (the vertical force, the two orthogonal shear forces, and the three moments, one about each orthogonal axis) via strain gages attached to the pylons. In this invention, the pylons are attached to a top plate, and can be fitted with an optional bottom plate and an optional mounting plate. The signal produced by the gages can be transmitted via wiring or wireless means directly to a data collection device, and, alternatively through a connector board, then to a pre-amplifier, then an amplifier, then finally to a data collection device. The output may be six or more channels, and can be electronically combined to six channels.

By measuring with two or more pylons, whereby each pylon measures all components of force and moment, measurement errors will be greatly reduced, including cross-sensitivity and, thereby, cross-talk. Thus, with independent measurements, assumption and calculation errors are greatly reduced.

DETAILED DESCRIPTION OF THE INVENTION

The invention described herein is a load transducer for independent measurement of up to and including all three force and all three moment components utilizing strain gages attached to two or more load cells within a force plate.

Figure 1:
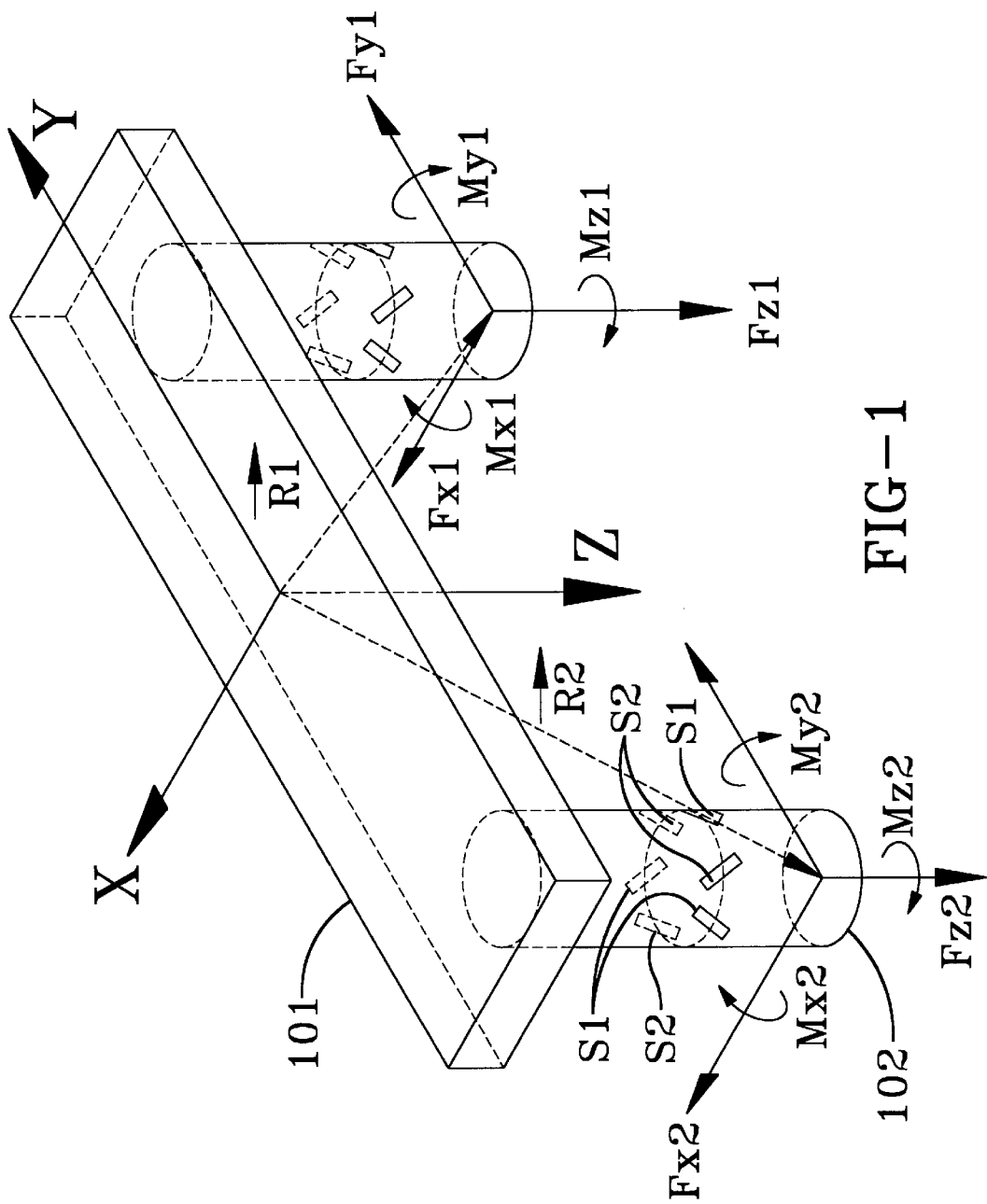
FIG. 1 is a perspective view of the force plate showing a top plate and two load cells (pylons) attached thereto, as described in the first preferred embodiment.
Figure 4:
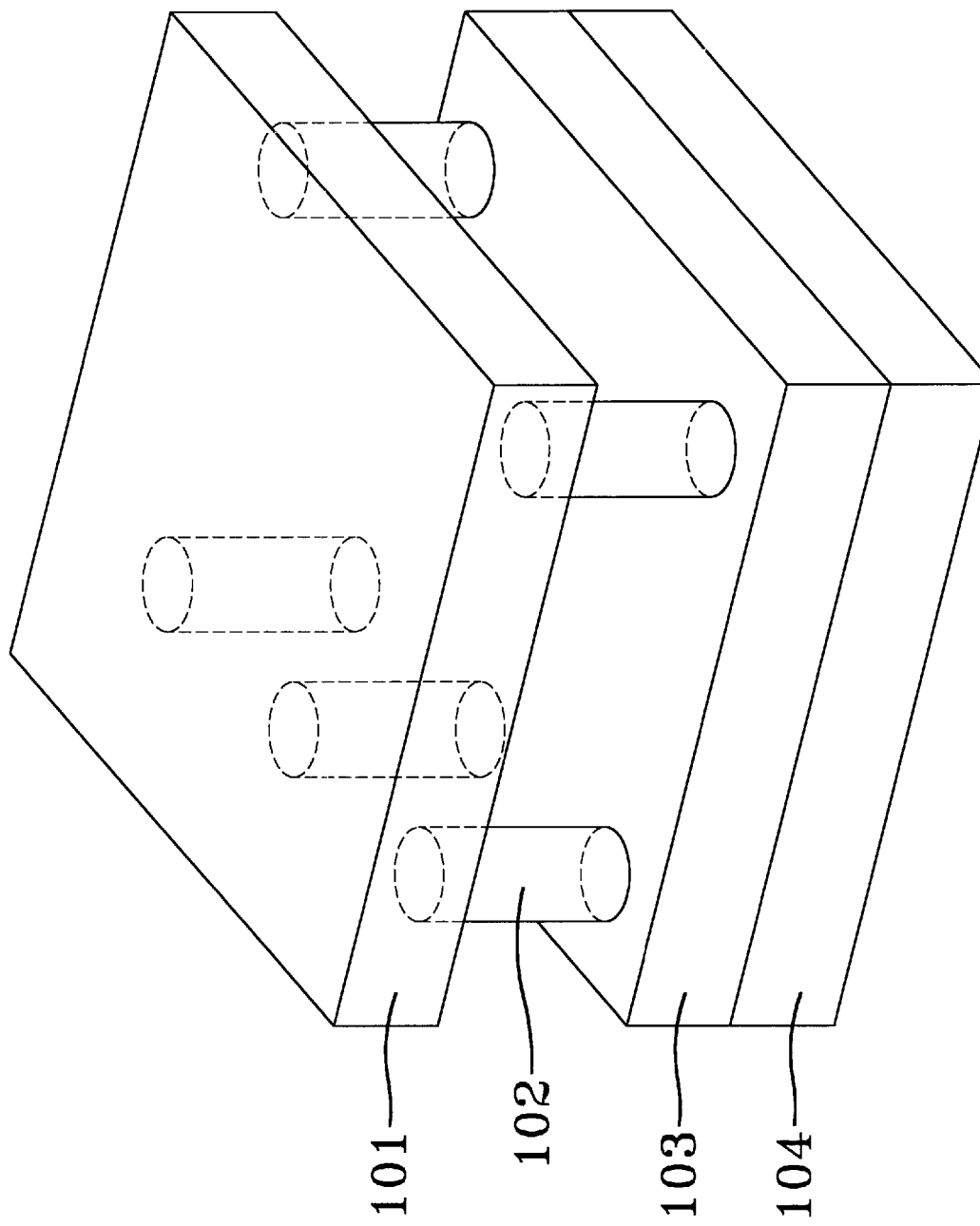
FIG. 4 is a perspective view of the force plate showing a top plate and at least two load cells attached thereto, as well as the optional base plate and optional mounting plate.

A preferred embodiment places two load cells 102 attached to a top plate 101 with an optional base plate 103 and an optional mounting plate 104 as in FIG. 1 and FIG. 4.

Attached to the load cells (pylons) 102 are strain gages S-1 and S-2 geometrically positioned on each pylon to measure all force and moment components (Fx, Fy, Fz, Mx, My, Mz), thereby, measuring all six degrees of freedom. There must be at least as many gages as desired component measurements. In this preferred embodiment, at least six gages are attached to each pylon allowing for measurement of all force and moment components by each pylon.

Figure 5:
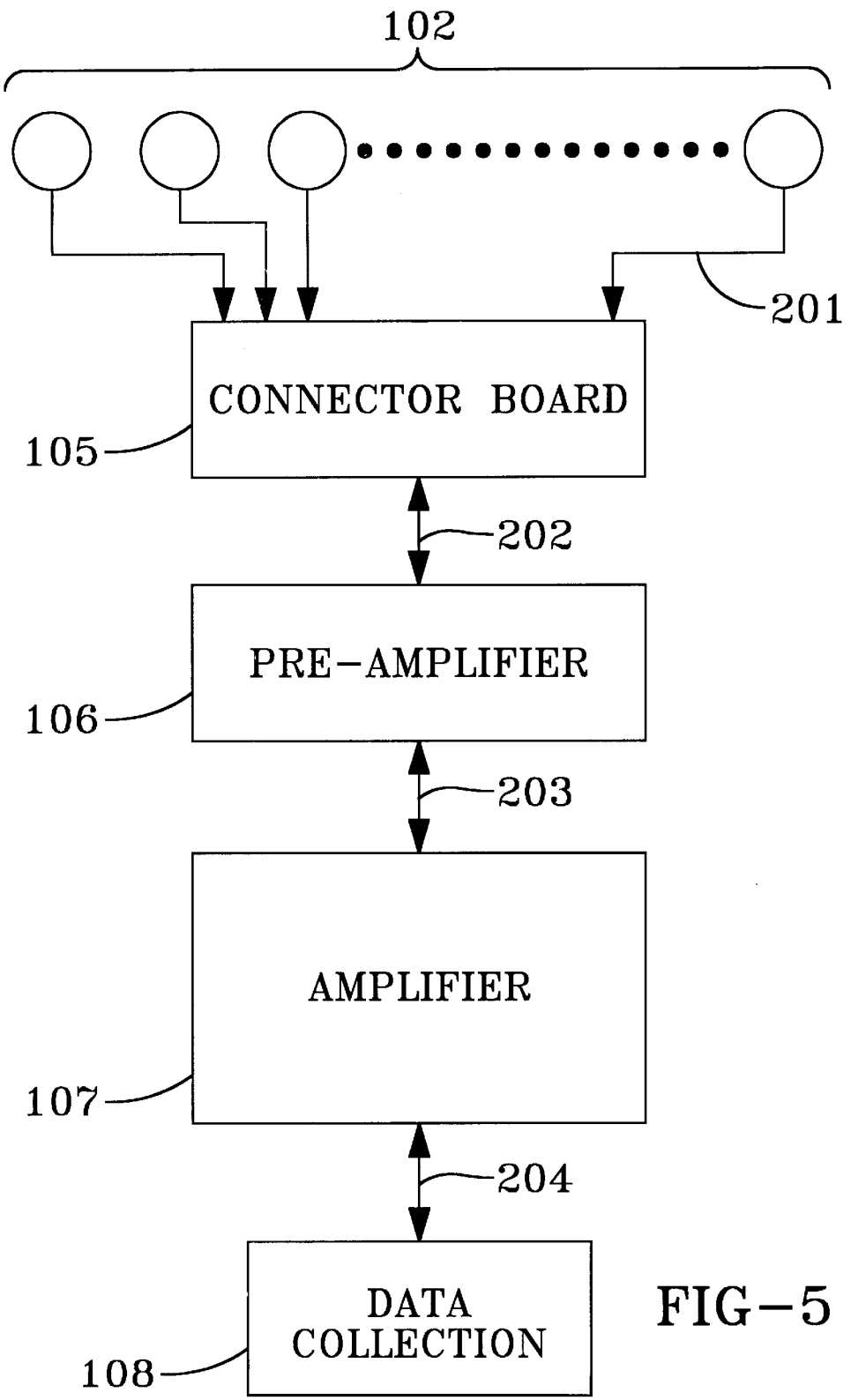
FIG. 5 is a diagram of the connections for the transfer of the data collected by the strain gages on the load cells to the connector board, the pre-amplifier, the amplifier, and the data collection device.

In this preferred embodiment, as shown in FIG. 1, when a load is applied to the top plate 101, the gages on the cells measure all force and moment components the cell is subjected to, and transmit the data via wiring 201 through 204 or by wireless means directly to a data collection device 108 for interpretation and reading, such as a computer, oscilloscope, or a voltmeter among other methods, as shown in FIG. 5. The output may be six or more channels, and can be electronically, via hardware or software, combined to six channels. Alternatively, the signals can be transmitted via wiring or wireless means 201 directly to a connector board 105 where they are electronically summed, as shown in FIG. 5. When using a connector board 105, the signals are conditioned and amplified by an optional pre-amplifier device 106, as shown in FIG. 5. Then, the signals can be further conditioned and amplified by an optional second stage amplifier 107, as shown in FIG. 5. Finally, the signal is received by a data collection device 108 for interpretation and reading. The output forces and moments are vector sums of the forces and moments acting on individual pylons, with respect to the origin of the load transducers. Therefore, the following calculation applies for the preferred embodiment, as shown in FIG. 1:

$$\vec{F} = \vec{F}_1 + \vec{F}_2$$

and $\vec{M} = \vec{M}_1 + \vec{M}_2 + \vec{R}_1 \times \vec{F}_1 + \vec{R}_2 \times \vec{F}_2$ where $\vec{F}$ and $\vec{M}$ are the resultant force and moment vectors, $\vec{F}_1$, $\vec{F}_2$ and $\vec{M}_1$, $\vec{M}_2$ are respectively the force and moment vectors measured by the two load cells, $\vec{R}_1$ and $\vec{R}_2$ are vectors defining the positions of the two load cells relative to the transducer coordinate system, and x indicates vector multiplication (all vectors have x, y, and z components).

Figure 2:
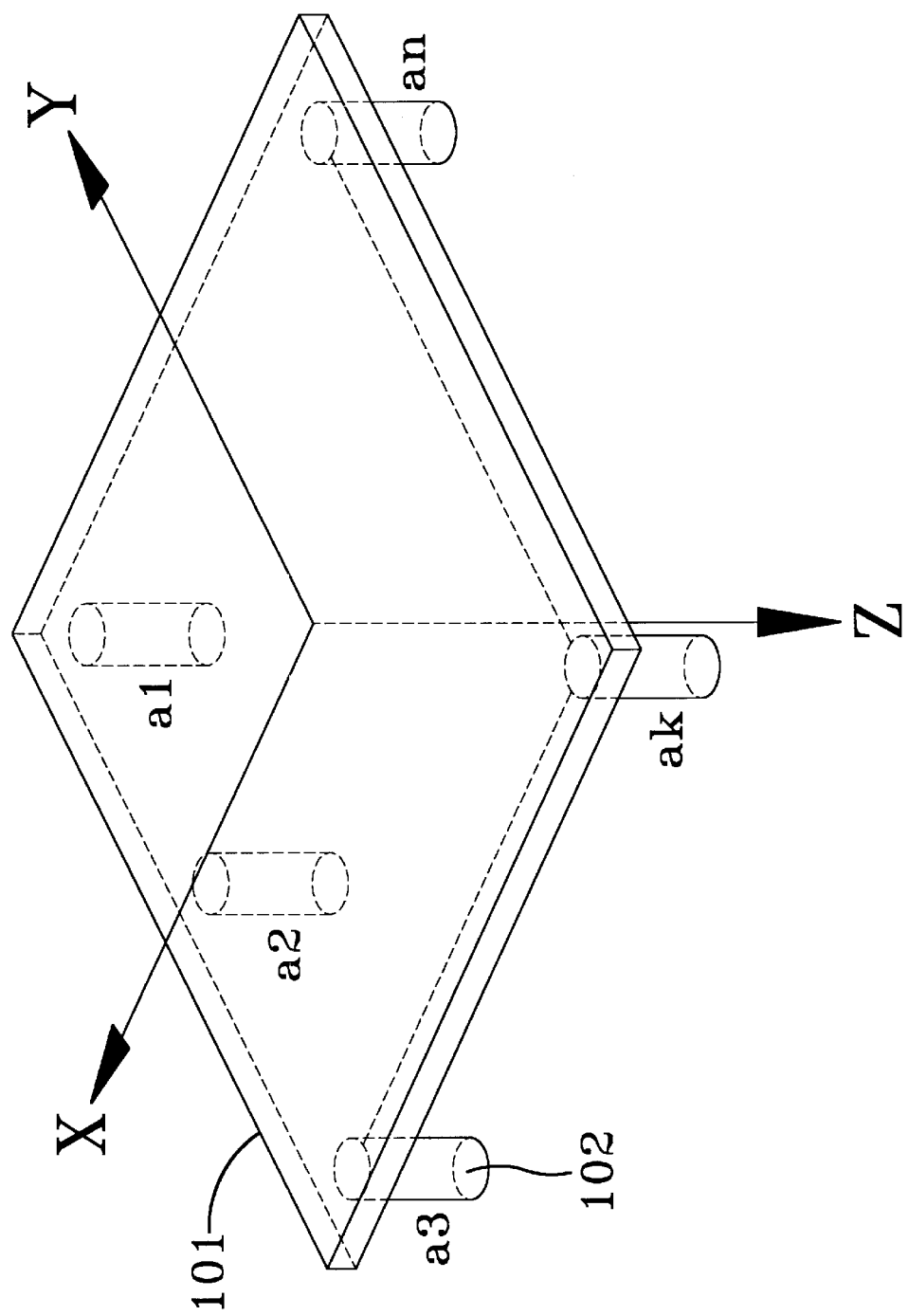
FIG. 2 is a perspective view of the force plate showing a top plate and multiple load cells attached thereto, as described in the second preferred embodiment.

In another preferred embodiment, as shown in FIG. 2, at least two load cells (pylons) 102al through 102an are placed in the same load transducer as the above preferred embodiment, wherein the pylons 102 are attached to a top plate 101 with an optional bottom plate 103 and an optional mounting plate 104, as shown in FIG. 4. Attached to the pylons 101 are the required number of gages in the proper geometric position to measure the desired number of force and moment components. Again, there must be at least as many gages as desired measurements. As above, the output can be six or more channels, and can be transmitted via wiring or wireless means 201 through 204 directly to a data collection device 108, and, alternatively through a connector board 105, pre-amplifier 106, amplifier 107, and finally to a data collection device 108, as shown in FIG. 5. A vector sum of the forces and moments gives the resultant force and moment vectors.

Figure 3:
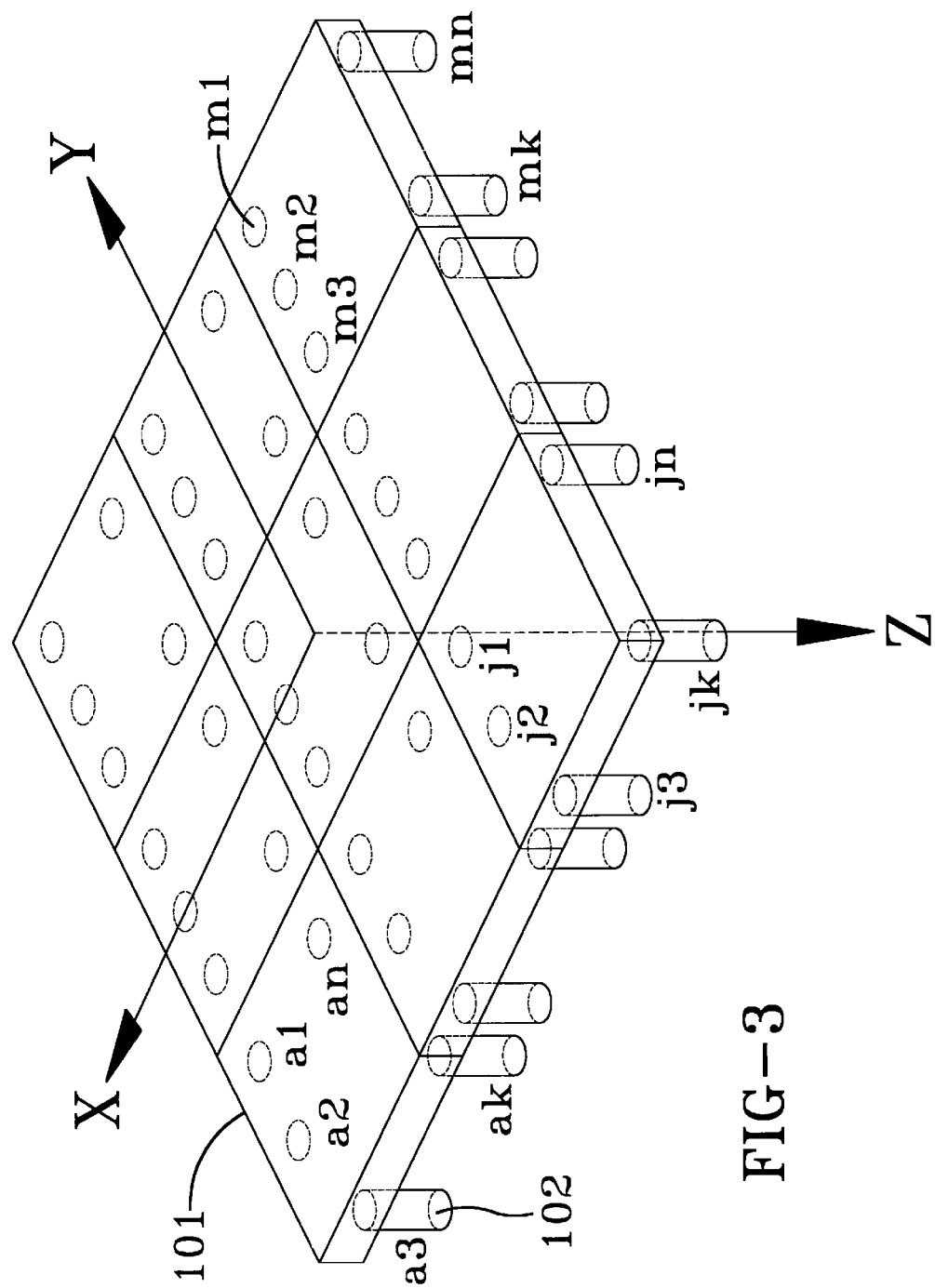
FIG. 3 is a perspective view of a force plate array system where multiple plates with at least two load cells attached to top plates are connected to measure a greater area, as described in the third preferred embodiment.

Another preferred embodiment incorporates either of the two previous load transducers, from above and FIG. 1 and FIG. 2, connected with at least one other load transducer to form an array of force plates, as shown in FIG. 3. As before, at least two load cells (pylons) 102al through 102mn are attached to a top plate 101 and an optional bottom plate 103 with an optional mounting plate 104, as shown in FIG. 4. Attached to each pylon 102 in the force plates are enough strain gages geometrically attached to each pylon 102 to allow for the desired number of measurements. Thus, each pylon 102 is capable of measuring all force and moment components, as well as all six degrees of freedom within the force plate array, as shown in FIG. 3.

In this preferred embodiment, and as in the above embodiments and as shown in FIG. 5, the signals produced by the strain gages can be directly transmitted via wiring or wireless means 201 through 204 to a data collection device 108, and, alternatively can be transmitted through a connector board 105, then a pre-amplifier 106 for signal conditioning and amplification, then an optional second stage amplifier 107 for greater signal conditioning and amplification, and, finally to a data collection device 108 for interpretation and reading. The output can be in six or more channels, and can be electronically combined to six channels.

I claim:

1. A force plate for measuring all force and moment components of a load comprising:

a) a top plate for receiving a load to be measured;

b) at least two load cells attached in supporting relationship to said top plate, each of said at least two load cells having at least six strain gages attached to a respective one of said load cells for generating at least six measurement signals, a respective one of said signals representing a measurement of a respective one of three force and three moment components of a load applied to said top plate;

c) each of said six measurement signals generated by each of a respective one of said at least two load cells being operatively communicated to a data collection device independently from the measurement signals generated by the strain gages on any other one of said at least two load cells.

2. The force plate defined in claim 1 further including a bottom plate vertically spaced from said top plate and wherein said load cells are attached to said top and bottom plates.

3. The force plate defined in claim 1 wherein said measurement signals are communicated to an amplifier prior to communication to said data collection device.

4. The force plate defined in claim 1 wherein a plurality of said force plates are disposed closely adjacent to one another to form an array of generally parallel horizontally disposed top plates providing a greater area then any one of said top plates in said array, and wherein at least five load cells are operatively attached to each of the force plates in the array.

5. The force plate defined in claim 1 wherein at least five load cells are attached to said top plate and selectively positioned relative to one another to increase the rigidity of the top plate per unit of its thickness.

* * * * *